United States Patent [19]

Gritter

[11] 4,371,824
[45] Feb. 1, 1983

[54] BASE DRIVE AND OVERLAP PROTECTION CIRCUIT

[75] Inventor: David J. Gritter, Southfield, Mich.

[73] Assignee: Eaton Corporation, Cleveland, Ohio

[21] Appl. No.: 55,139

[22] Filed: Jul. 5, 1979

[51] Int. Cl.³ .............................................. H02P 7/58
[52] U.S. Cl. .................................... 318/722; 318/681;
318/802; 318/801; 318/808; 318/811; 318/812;
363/56; 363/134; 361/18
[58] Field of Search ..................................... 363/55–57,
363/79, 133–134, 139, DIG. 1; 318/801, 802,
807–812, 341, 599, 681, 722, 723, 434, 635;
361/18

[56] References Cited

U.S. PATENT DOCUMENTS

| | | | |
|---|---|---|---|
| 3,609,507 | 9/1971 | Beck | 363/56 |
| 3,629,725 | 12/1971 | Chun | 363/55 |
| 4,126,819 | 11/1978 | Stobbe et al. | 318/798 |
| 4,155,113 | 5/1979 | Simmons | 363/56 |
| 4,213,103 | 7/1980 | Birt | 363/56 |

OTHER PUBLICATIONS

IBM Technical Disclosure Bulletin, Antistorage Overlap Circuit, B. E. Hart, vol. 16, No. 6, Nov. 1973.

Primary Examiner—J. V. Truhe
Assistant Examiner—Eugene S. Indyk
Attorney, Agent, or Firm—R. J. McCloskey; J. G. Lewis

[57] ABSTRACT

An inverter (34) which provides power to an A. C. machine (28) is controlled by a circuit (36) employing PWM control strategy whereby A. C. power is supplied to the machine at a preselectable frequency and preselectable voltage. This is accomplished by the technique of waveform notching in which the shapes of the notches are varied to determine the average energy content of the overall waveform. Through this arrangement, the operational efficiency of the A. C. machine is optimized. The control circuit includes a microcomputer and memory element which receive various parametric inputs and calculate optimized machine control data signals therefrom. The control data is asynchronously loaded into the inverter through an intermediate buffer (38). A base drive and overlap protection circuit is included to insure that both transistors of a complimentary pair are not conducting at the same time. In its preferred embodiment, the present invention is incorporated within an electric vehicle (10) employing a 144 VDC battery pack (32) and a three-phase induction motor (18).

30 Claims, 11 Drawing Figures

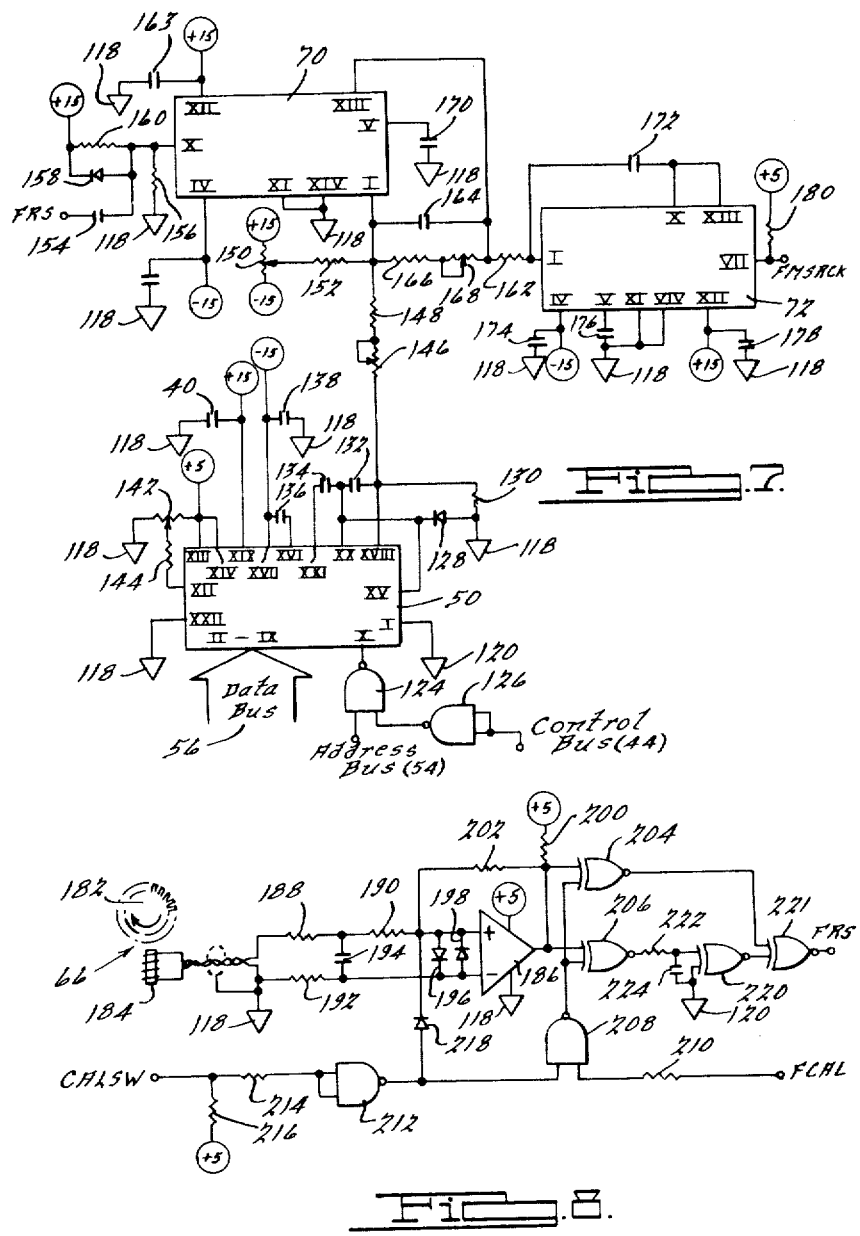

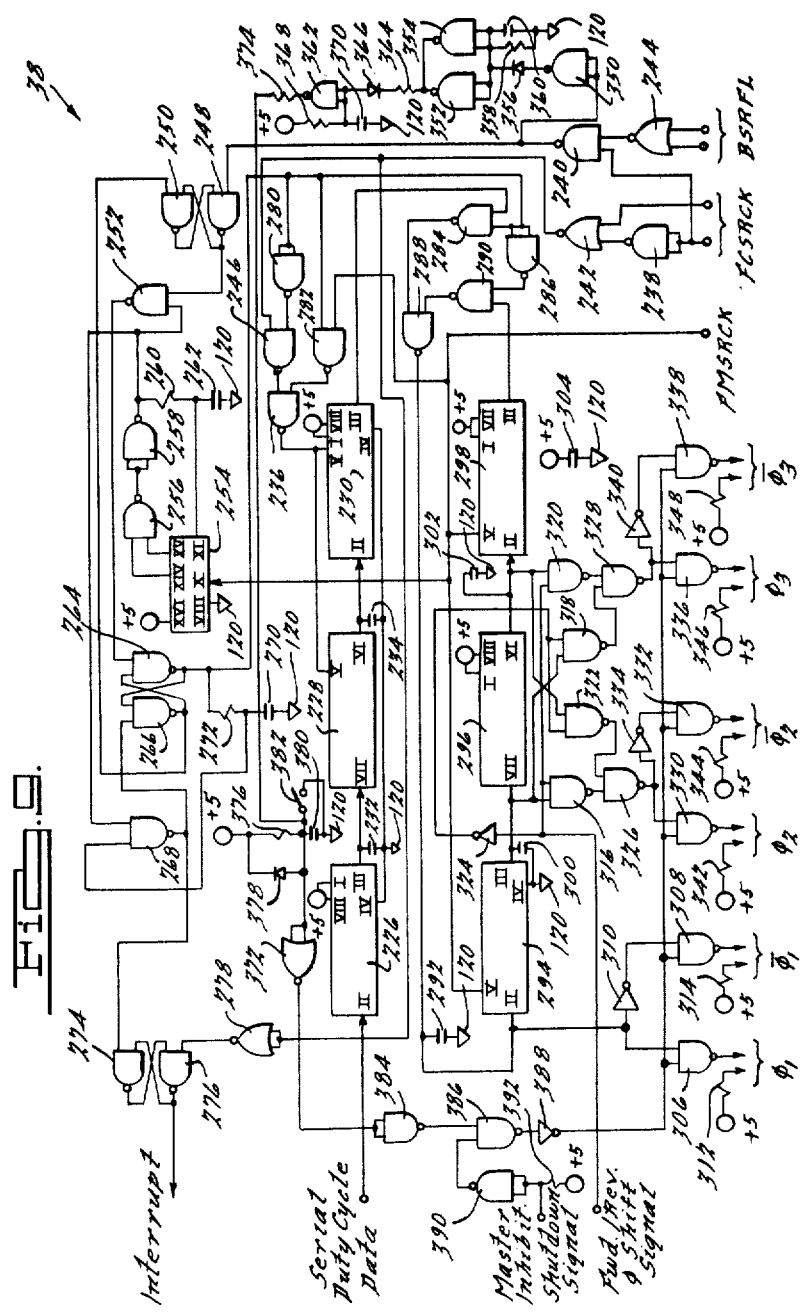

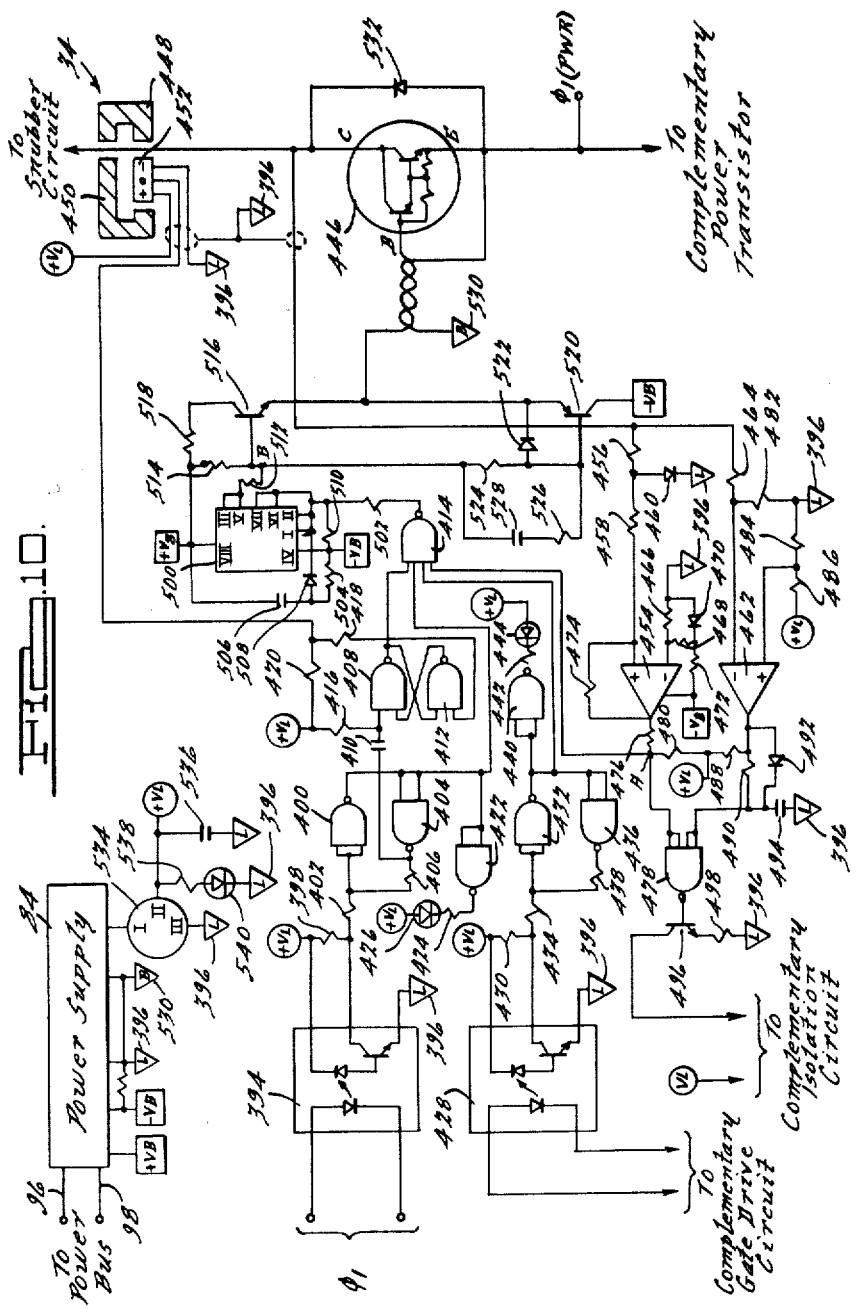

BASE DRIVE AND OVERLAP PROTECTION CIRCUIT

INTRODUCTION

The present invention relates to apparatus for protecting A.C. machine inverters and specifically to such apparatus which employ base drive and overlap protection circuits. Furthermore, this invention relates to the application of such apparatus within electric powered vehicles.

BACKGROUND OF THE INVENTION

The electric powered passenger vehicle has long been considered one of the most attractive alternatives to conventional internal combustion engine driven types from the standpoints of overall efficiency, environmental impact and, most recently, alternative fuel capability. Many commercial enterprises and private individuals, some under the auspices of the federal government, have proposed various approaches to implementing an electrically powered vehicle. To date, there have been virtually no commercially successful vehicles produced on a large scale.

A large number of approaches to the implementation and control of an electric vehicle are evidenced in the patent literature. Most of the approaches fall within one of three general catagories of motive power source. These categories are hybrids, D.C. motor drives and induction motor drives.

The first type, that most frequently found in the patent literature, is the hybrid vehicle, comprising a small gasoline fueled internal combustion engine which mechanically drives an electrical generator which, in turn, supplies electrical energy to an A.C. or D.C. motor. With this arrangement, the gasoline engine can operate at a constant speed (at relatively high efficiency) and achieve a substantial fuel saving compared with an engine employing the conventional wide range of operation. A shortcoming of many hybrids is that they are relatively heavy, requiring an electrical generator and motor as well as the gasoline engine. Additionally, the engine requires substantial amounts of a volatile liquid fuel and generates exhaust emissions.

A second approach taken in the development of electric vehicles is the use of a bank of batteries which supply electrical energy to a D.C. motor. A variable-speed motor drive circuit provides easy and versatile control of the vehicle. The principal advantage of this arrangement is that a D.C. motor control system requires a relatively simple power and control circuit. Unfortunately, this advantage is often more than offset by the relatively large initial cost and maintenance expenses of the motor itself. In addition, D.C. machinery is relatively heavy and bulky, factors which do not lend themselves well to implementation within a lightweight compact vehicle. Finally, D.C. motors inherently require choppers and commutators which create sparks and RF pollution which can be controlled only at additional expense.

The third, and most attractive approach from the applicant's viewpoint, is an A.C. vehicle employing a battery bank and an induction motor. A.C. motors are relatively light-weight, inexpensive and efficient when compared to D.C. motors. A.C. induction motors, with no brushes or commutation, are more rugged and reliable than their D.C. counterparts and require substantially less maintenance. Related to power-to-weight ratio is the fact that A.C. machines can be driven at substantially greater speeds that D.C. motors. Because A.C. motors do not generate sparks, they can readily be employed in dusty, explosive and highly humid atmospheres or high altitudes. Additionally, A.C. motors can be liquid cooled if the application so requires.

Although typically superior to D.C. motors in electric vehicle applications, A.C. motors often require complex control circuits. In addition to being relatively expensive, such control circuits have a propensity to "shoot-through" under a fault condition, resulting in a sudden, severe jolt of breaking torque. "Shoot-through" is most often experienced in control circuits employing complimentary pairs of transistors or silicon controlled rectifiers (SCR) which are series connected across buses and alternately triggered into a conducting state. If, through a fault in the control signal, both complimentary devices are conductive at the same time, an effective short circuit is created between the buses which will result in a large surge of current and torque. Such a condition can damage the control circuit and, in an electric vehicle application, can potentially precipitate in a loss of vehicle control.

It will be apparent from a reading of the specification that the present invention may be advantageously utilized in many different control applications, both mobile and fixed. However, the invention is especially useful when applied to electric powered passenger commuter vehicles, and will be described in connection therewith.

BRIEF DESCRIPTION OF THE INVENTION

The present invention provides a base drive and overlap protection circuit which is relatively simple, inexpensive and substantially reduces the chance of a fault related "shoot-through". The inventive circuit includes gating means which generates a switching signal to cause power switching means, such as a transistor or SCR, to change conductive state only upon receipt by the gating means of (1) a switch command signal from a control circuit, (2) a negative current signal from a switch current monitor and (3) an enable signal from a complimentary base drive and overlap protection circuit. This arrangement has the advantage of preventing the power switching means from changing state unless at least three independently derived conditions exist.

According to another feature of the invention, an overcurrent latch causes the power switching means to change to a nonconducting state when the flow of current therethrough exceeds a predetermined value. This arrangement further reduces the chance of a "shoot-through" by adding a fourth condition which must exist for the power switching means to remain in the conductive state.

According to another feature of the invention, the overcurrent latch operates to reset when a subsequent switch command signal is received. With this feature, the circuit resets itself after each switch command signal.

According to still another feature of the invention, means is provided to delay generation of the complimentary base drive enabling signal for a predetermined period of time. This arrangement has the advantage of assuring that one conductive state transistion is completed before the complimentary power switch means can begin changing state.

These and other features and advantages of this invention will become apparent upon reading the following specification, which, along with the patent drawings, describes and discloses the preferred illustrative embodiment of the invention in detail.

The invention makes reference to the accompanying drawings.

BRIEF DESCRIPTION OF THE DRAWINGS

FIG. 7, is a schematic diagram of the digital to analog converter, frequency to voltage converter and voltage controlled oscillator illustrated in FIG. 4;

FIG. 8, is a schematic diagram of the speed signal conditioning circuit of FIG. 4;

FIG. 9, is a schematic diagram of the asynchronous waveform data interface of FIG. 4;

FIG. 10, is a schematic diagram of a complimentary half of one leg of the power bridge of FIG. 5.

ABBREVIATIONS EMPLOYED IN SPECIFICATION

ADC: analog to digital converter
BSRFL: buffer shift register full
CALSW: calibrating waveform switch signal
DAC: digital to analog converter
EV: electric vehicle
FCAL: calibration frequency
FCSRCK: frequency of computer shift register clock
FINR: frequency of input rotor
FMSRCK: frequency of master shift register clock
FRS: frequency of rotor signal
F/V: frequency to voltage converter
LED: light emitting diode
MPX: multiplexer
OP AMP: operational amplifier
PROM: programmable read only memory
RAM: random access memory
VCO: voltage controlled oscillator
VDC: volts direct current
V/HZ: volts per hertz

DETAILED DESCRIPTION OF THE PREFERRED EMBODIMENT OF THE INVENTION

Figure 1:
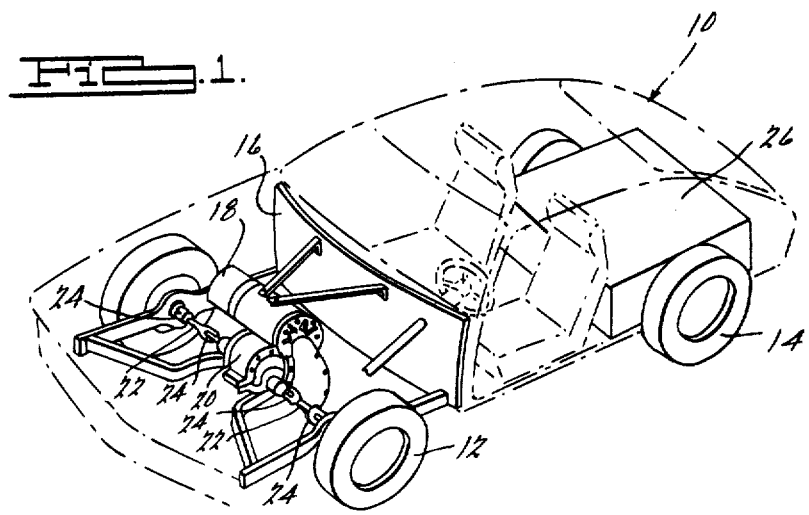
FIG. 1, is a perspective phanton view of an automobile incorporating the preferred embodiment of the present invention.

Referring to FIG. 1, packaging of the present invention within an electric vehicle (EV) 10 is conceptualized. Electric vehicle 10 is conventionally configured, having driven front wheels 12 and free rear wheels 14. An engine compartment, defined by the area forward of a firewall 16, contains a transversally mounted three-phase induction motor 18 which operates to drive wheels 12 through a two-speed transmission 20, drive shafts 22 and interconnecting u-joints 24. Motor 18 and transmission 20 are integrally formed within a common housing. The details of the front suspension have been deleted for the sake of simplicity. The mounting of motor 18 and transmission 20 as well as the independent front end suspension of EV 10 is so well known in the art as to require no elaboration here.

A ventilated compartment 26 disposed within EV 10 behind the driver and passenger seats contains a 144 VDC battery pack as well as an inverter and most of the control circuitry. Motor 18 and compartment 26 are electrically interconnected by appropriately sized cables (not illustrated). Additionally, provision must be made to periodically connect EV 10 with a source of charging current such as at the owner's home.

The present invention can be applied to applications other than electric vehicles. FIG. 1 is intended only as an aid to the reader in conceptualizing the packaging as it would appear in a typical commuting passenger vehicle. The details of the illustrated arrangement are therefor not to be considered limiting in any sense.

Figure 2:
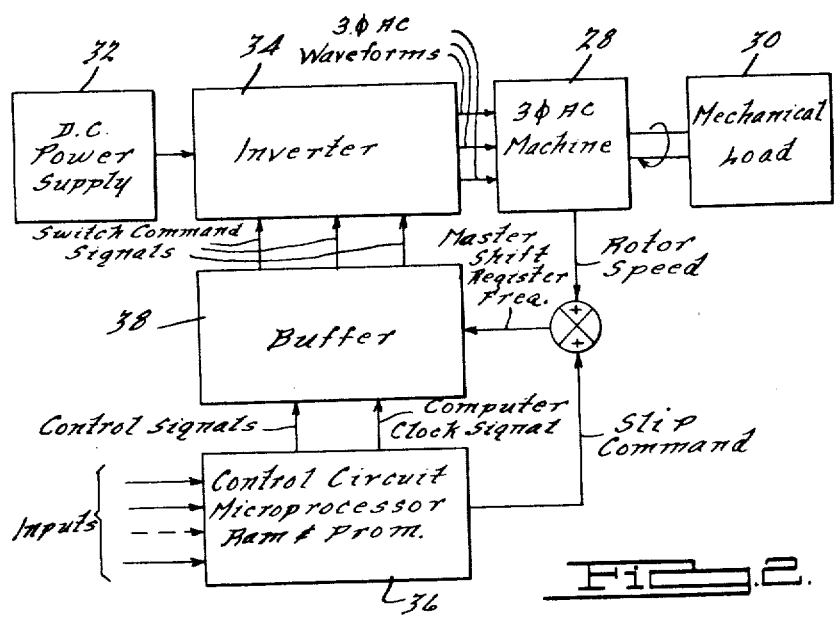
FIG. 2, is a block diagram of the pwm inverter control and its implementation within the drivetrain of the automobile of FIG. 1.

Referring to FIG. 2, a simplified block diagram of an EV drive package incorporating the present invention is illustrated. A three-phase A.C. machine 28 drives a mechanical load 30 and is energized by a D.C. power supply 32 through an intermediate inverter 34. Inverter 34 converts direct current from power supply 32 into three-phase A.C. waveforms. Inverter 34 receives switch command signals from a control circuit 36 through an intermediate buffer 38. The duty cycle and wave shape data of the three-phase A.C. waveforms are determined by the switch command signals which are derived from a plurality of parametric inputs into control circuit 36.

The circuit of FIG. 2 operates as follows. Control circuit 36, which contains a microprocessor, random access memory (RAM) and programmable read only memory (PROM), receives various parametric inputs such as voltage, current and temperature levels as well as driver torque demand in the case where the present invention is applied to EV 10. Control circuit 36 then serves to determine the optimum slip and duty cycle information for a given torque demand as a function of the inputs and look-up tables contained in memory. Control signals containing duty cycle and wave shape data are then transferred to buffer 38 at a rate determined by a clock within control circuit 36. The control signals are momentarily stored in buffer 38 while a slip command signal from control circuit 36 is summed with a signal from A.C. machine 28 representing rotor speed, resulting in a master shift register frequency signal representative of the A.C. machine stator frequency. The control signals stored in buffer 38 are then synchronized with A.C. machine 28 and transferred to inverter 34 in a form of properly phased switch command signals.

This asynchronous data transfer technique permits the microprocessor in control circuit 36 to be non-dedicated and used for ancillary purposes while not generating waveforms. Such uses, in the preferred embodiment of the invention, are the monitoring of system limits, executing drive diagnostic routines, establishing operator readout, transforming driver command into output torque commands and optimizing volts per hertz (V/HZ) during steady state conditions. The control loop operates to track the slip command. The detailed embodiment of the invention will be described in connection with an application within EV 10. A.C. machine 28 is therefore considered to correspond with three-phase induction motor 18 but it is contemplated that A.C. machine 28 could also be a regenerative absorber or the like. Likewise, mechanical load 30 represents the torque applied by and to motor 18 by EV 10.

In the generation of control signals, control circuit 36 employs the technique of waveform notching which is well known in the art and described in detail in U.S. Pat. No. 3,538,420, issued Nov. 3, 1972 to F. N. Klein and which is incorporated herein by reference. Accordingly, for the sake of brevity, the details of this technique will be omitted in this specification.

Figure 3:
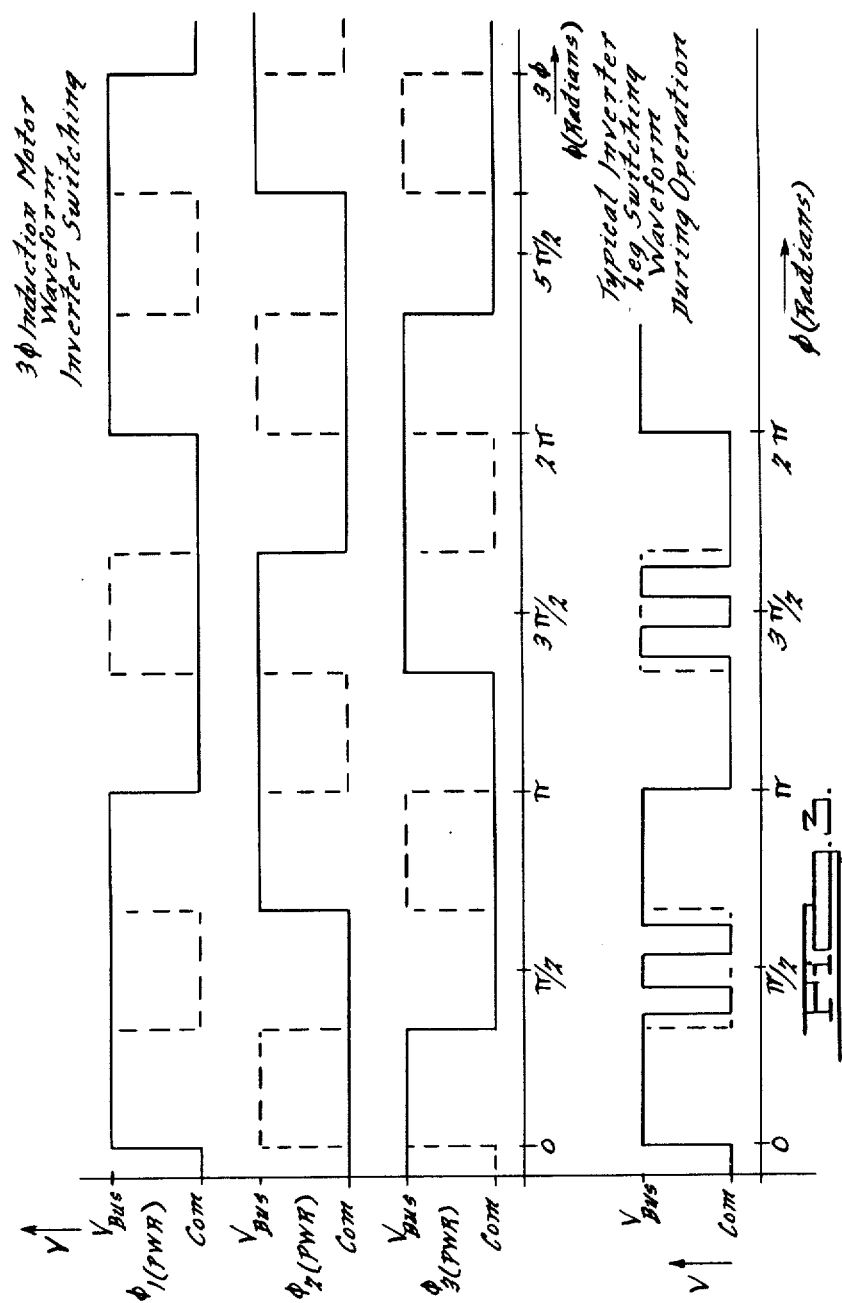
FIG. 3, represents various waveforms which are generated by the control apparatus of FIG. 2 when operated in the manner prescribed herein.

Referring to FIG. 3, the format of the notching of the three-phase waveforms is illustrated. The first three waveforms in FIG. 3 illustrate the three separate waveforms corresponding with each phase to D.C. bus common labeled $\Phi_{1(PWR)}$, $\Phi_{2(PWR)}$ and $\Phi_{3(PWR)}$ respectively. The dotted lines in the waveforms represent the middle sixty degrees of each half cycle which is the space allocated for the notches, i.e., the maximum notch envelope. As is obvious to one skilled in the art, making the notches larger will reduce the percentage duty cycle or, to state it differently, if there were not notches, the duty cycle would be 100% and maximum voltage transfer to motor 18 would be achieved. On the other hand, if the full notch enelope were employed, the waveforms of the three-phase would be square waves in phase with one another, resulting in 0% duty cycle with no net voltage applied to the motor 18.

The fourth waveform in FIG. 3 shows the typical inverter leg switching waveform during operation in which two notches are symmetrically disposed within the envelope in each half cycle. Control of motor 18 is therefore achieved by selectively varying the notching within the envelope such as described in U.S. Pat. No. 3,538,420. There are numerous other notching schemes than that described in U.S. Pat. No. 3,538,420. Accordingly, the present invention is not to be limited to any particular single notching scheme.

Figure 4:
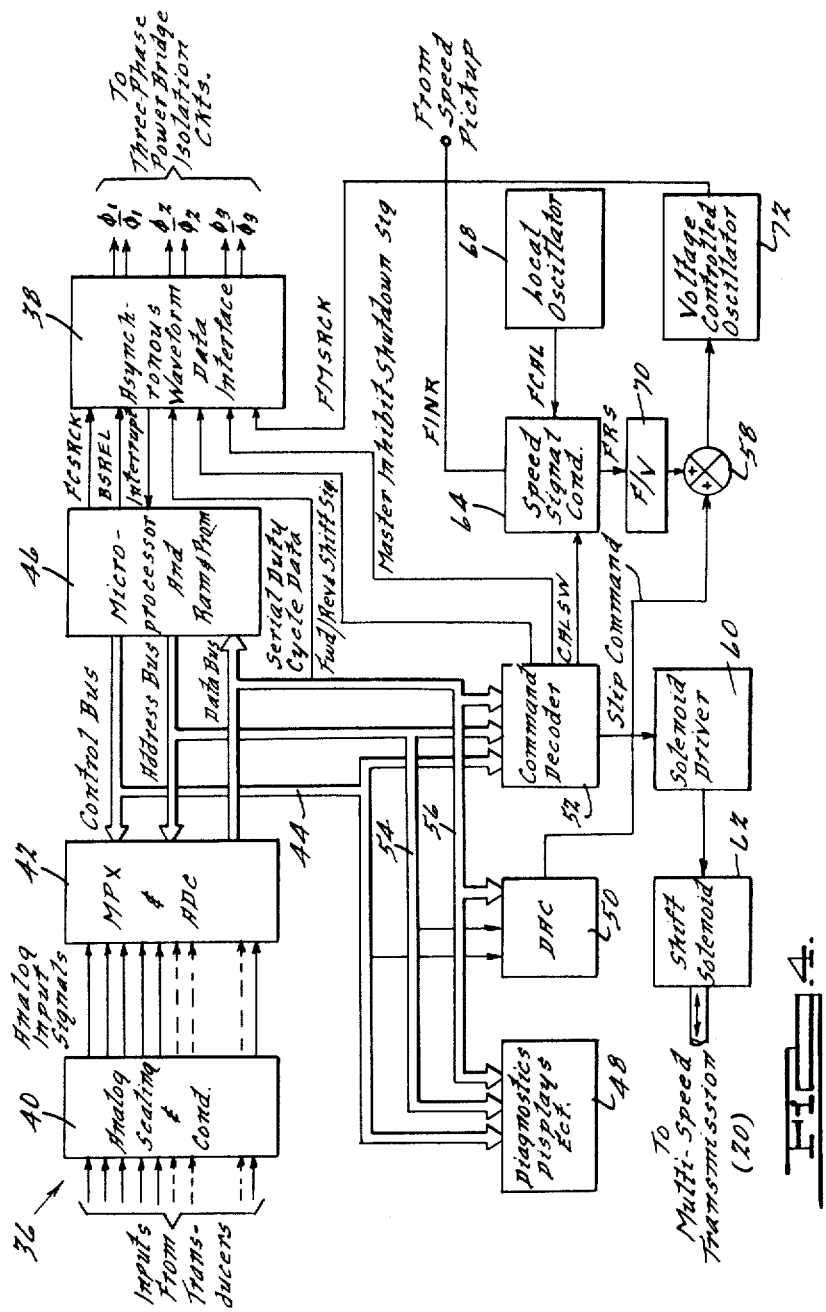
FIG. 4, is a partial block diagram of the control apparatus of FIG. 2.
Figure 5:
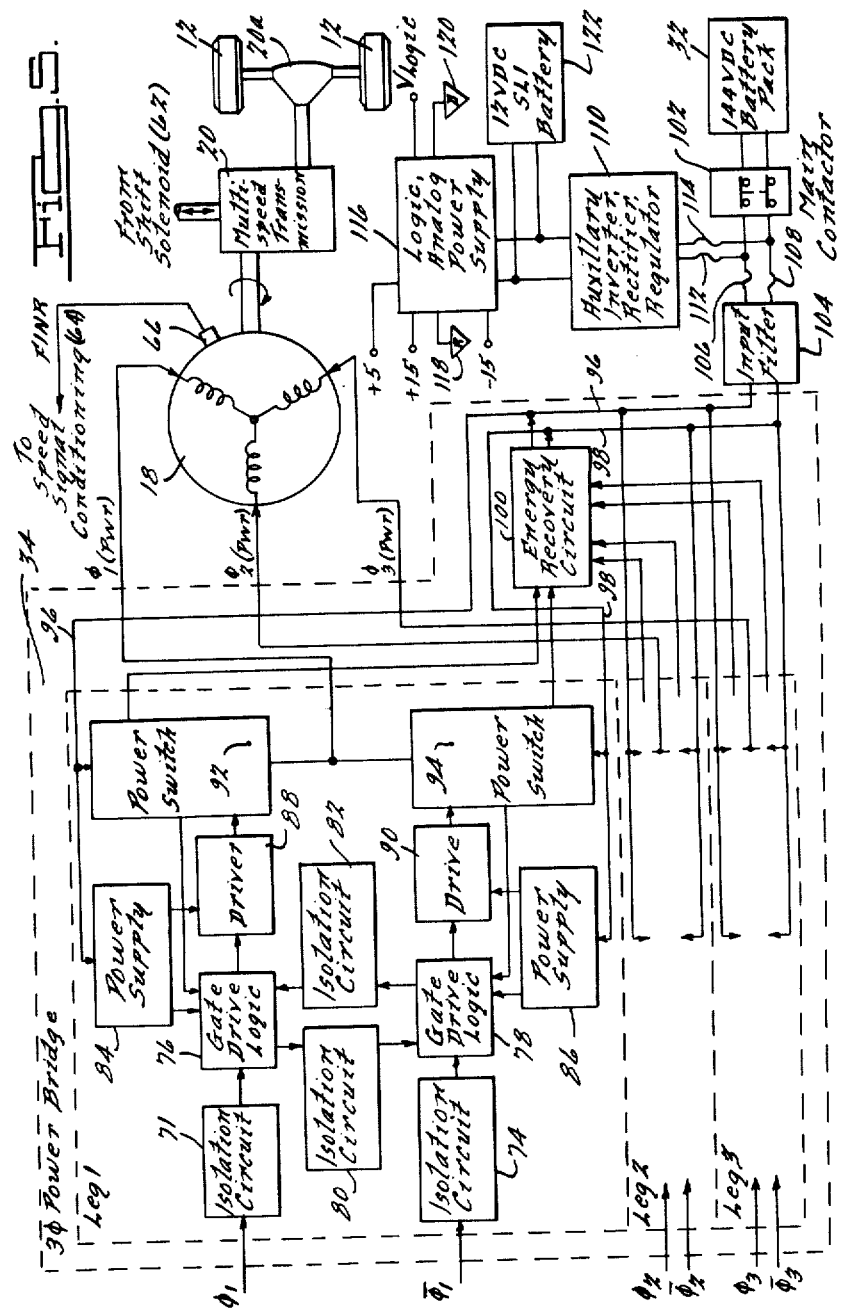
FIG. 5, is a partial block diagram, which, along with FIG. 4, expands upon the block diagram of FIG. 2.

Referring to FIGS. 4 and 5, a detailed block diagram of the present invention is illustrated. FIG. 4 generally comprises control circuit 36 and buffer or asynchronous waveform data interface 38. FIG. 5 illustrates an expanded inverter or three-phase power bridge 34, motor 18, transmission 20, and D.C. power supply or 144 VDC battery pack 32.

Referring to FIG. 4, the outputs from various temperature, current and voltage sensing transducers are connected to appropriate analog, scaling and conditioning (including zero-span where needed) circuits 40. The analog input signals from circuits 40 are connected to a 16 channel multiplexer (MPX) chip with analog to digital conversion (ADC) 42 such as that manufactured by National Semiconductor, Model ADC0816. Typical inputs received by analog scaling and conditioning circuits 40 are motor stator frequency, reference voltages, drift nulling signals, bus current, bus voltage, battery temperature, heat sink temperature, motor temperature, vehicle in motion indication, direction command, driver requested acceleration/deacceleration, brake signal, and various inputs for setting internal codes for diagnostics and displays. In addition, it is contemplated that other inputs may be desired for other applications. Accordingly, the recited inputs are not to be considered limiting.

A control bus 44 interconnects the microprocessor, RAM and PROM 46 with the MPX and ADC chip 42 as well as diagnostics and displays circuits 48, a digital to analog converter (DAC) 50 and a command decoder circuit 52. An address bus 54 and a data bus 56 likewise interconnect microprocessor 46, MPX and ADC 42, diagnostics and displays circuits 48, DAC 50 and command decoder 52.

DAC 50 operates upon command from microprocessor 46 to transmit a slip command signal to a summing junction 58. Command decoder 52, likewise upon direction from microprocessor 46 generates and routes a solenoid driver command signal to a solenoid driver 60 which, in turn, actuates a shift solenoid 62 which operates mechanically to change the gear ratio of transmission 20. Shift solenoid 62 could also be hydraulically linked to transmission 20 if we located remotely therefrom. Command decoder 52 also operates to transmit microprocessor generated forward/reverse phase shift signals and master inhibit-shutdown signals to interface 38. Command decoder 52 is effectively operating as an output latch for output control signals. Finally, command decoder 52 operates to transmit a calibrating frequency switch signal (CALSW) which is directed to a speed signal conditioning circuit 64.

Speed signal conditioning circuit 64 selectively passes a speed signal representative of input rotor frequency (FINR) derived from a speed pickup or tach 66 on motor 18 or a frequency calibration signal (FCAL) from a local oscillator 68. The output of speed signal conditioning circuit 64 is a scaled rotor frequency signal (FRS) which passes through a frequency to voltage (F/V) converter 70 to summing junction 58. Summing the slip command and converted FRS signals will result in an output signal from summing junction 58 whose voltage is proportional to stator frequency. This signal is passed to a voltage controlled oscillator 72, the output of which is a frequency representating a multiple of the motor stator frequency which will be referred herein as the frequency master shift register clock signal (FMSRCK) which is an input to interface 38. Serial duty cycle data is input to interface 38 directly from data bus 56. Separate control lines interconnect microprocessor 46 with interface 38, passing frequency of computer shift register clock (FCSRCK) and buffer shift register full (BFRSL) information to interface 38. An additional interrupt line connects interface 38 with microprocessor 46.

Interface 38 has three twisted output pairs labeled $\Phi_1$ and $\overline{\Phi}_1$, $\Phi_2$ and $\overline{\Phi}_2$ and $\Phi_3$ and $\overline{\Phi}_3$ which passes the synchronized and phased serial duty cycle data to three $\Phi$ power bridge (inverter) 34 illustrated in FIG. 5. Each of the output pairs of interface 38 connect to one of the three legs or portions within bridge 34. It should be remembered that the preferred embodiment is intended to be illustrative only and that a motor of other than three phases could be employed within the scope of the present invention.

Because the circuitry within each of the three legs within power bridge 34 is identical with the others, the details of only one will be disclosed. Referring to FIG. 5, inputs for the first leg from interface 38 are both connected to isolation circuits 71, and 74, each of which, in turn, are connected to complimentary gate drive logic circuits 76 and 78 respectively. Gate drive logic circuits 76 communicates with logic circuit 78 through an isolation circuit 80 and gate drive logic circuit 78 communicates with logic circuit 76 through a second isolation circuit 82. Separate bi-polar switching power supplies 84 and 86 supply power to gate drive logic circuits 76 and 78 respectively. The output of gate drive circuits 76 and 78 are connected to drivers 88 and 90 respectively which are also powered by power supplies 84 and 86 respectively. The output of drivers 88 and 90 are connected to the control inputs of power switches 92 and 94 respectively. A positive power bus 96 from battery pack 32 is connected to power supply 84 and power switch 92. A negative bus 98 from battery pack 32 is connected to power supply 86 and power switch 94. Power switches 92 and 94 each have current and voltage sensing elements which are electrically connected gate drive logic circuits 76 and 78 respectively. The power output terminals of power switches 92 and 94 are commonly connected to one leg or coil of a wye connected motor 18. An additional output from each power switch 92 and 94 is connected an energy recovery circuit 100 which returns energy that would otherwise be lost during the collapse of inductive fields to busses 96 and 98. Each leg within power bridge 34 comprises two complimentary halves consisting of isolation circuit 71 (74), gate drive logic circuit 76 (78), power supply 84 (86), driver 88 (90), isolation circuit 80 (82) and power switch 92 (94). Gate drive logic circuits 76 and 78 are arranged so as to permit turning "on" only one power switch 92 or 94 at a time. If both power switches 92 and 94 were on simultaneously, a direct short would result between busses 96 and 98. This condition is not permissable and steps are taken to prevent such an occurrence.

The output shaft of motor 18 is connected to transmission 20 which, in turn, drives wheels 12 through differential gearing 20a which in FIG. 1 is intergally housed with transmission 20 and motor 18.

The 144 VDC battery pack 32 comprises 12 volt automotive batteries which are connected electrically in series to busses 96 and 98 through a manually operated contactor 102 and an input filter 104. In-line fuses 106 and 108 are installed in busses 96 and 98 respectively. The output terminals of contactor 102 are also connected to an auxiliary inverter, rectifier and regulator circuit 110 through in-line fuses 112 and 114. The output of regulator circuit 110 is connected to a logic and analog power supply 116 which provides a +5, ±15 outputs referenced to analog tie point 118 as well as an output logic voltage terminal and a reference digital common tie point 120. A conventional supplemental 12 VDC starting, lighting and ignition (SLI) battery 122 is also electrically connected to the input of power supply 116 to supply accessory vehicle loads.

Figure 6:
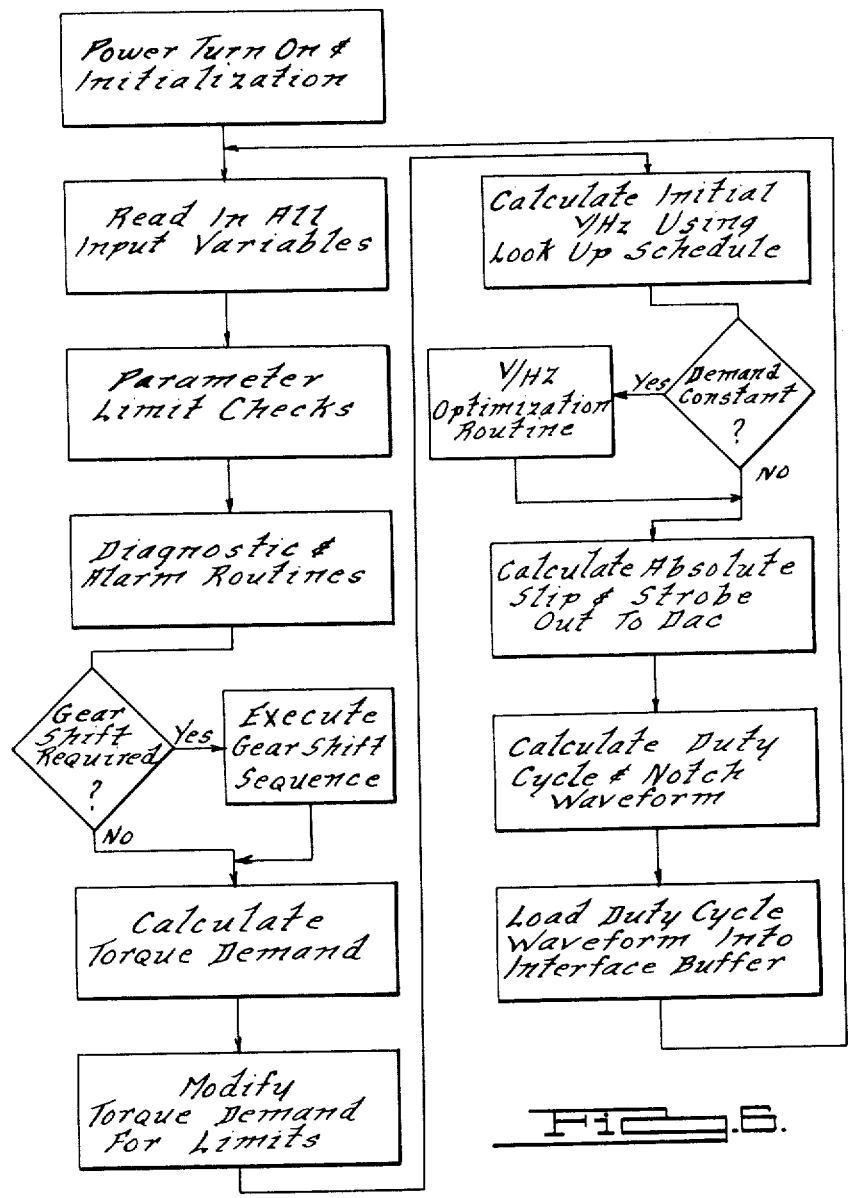
FIG. 6, is a block diagram of a software routine illustrating the main control loop in which optimized switch command signals and derived slip command signals are generated.

Referring to FIG. 6, a flow diagram of the main control loop algorithm is illustrated. After contactor 102 is closed and power is established, and microprocessor 46 is initialized, all input variables from transducers are read in the memory and parameter limit checks are made. Such tests would include temperatures over limit, over speed condition, excessive current levels and over/under bus voltage. At that point, any diagnostic and alarm routines are executed. Torque demand is then calculated from the operator controlled input and resulting demand modified if predetermined limits are exceeded. In such a case a large step demand for increased torque would be incrementally applied over a period of time. Once an in limit torque demand is established, an initial volts per hertz (V/HZ) ratio is calculated employing look-up tables established by the physical characteristics of motor 18 and stored in memory. If the torque demand made by the driver is constant or below a predetermined threshold, an ancillary V/HZ optimization routine is initiated to fine tune the V/HZ ratio to optimize overall operating efficiency i.e., to minimize bus current for given steady state conditions. Once the demand is determined to be not constant, microprocessor returns to the main program to calculate slip as a function of the product of the motor constant and torque demand divided by the square of V/HZ. This value is strobed out to DAC 50. Next, the duty cycle and notch waveform is optimally calculated to form the best comprimise between transistor switching rate constraints and harmonic losses due to the fact that the waveform is not sinusoidal. A detailed example of one method of so calculating duty cycle and notch wave forms is disclosed in U.S. Pat. No. 3,538,420. Briefly, the following steps are taken. The average motor line voltage is calculated from V/HZ and stator frequency data. Next, the optimum number of notches per notch envelope within each half cycle of the phase voltage waveforms is determined. The duty cycle is then calculated by dividing the average voltage by the bus voltage. Finally, the actual shape of the pulse waveform is determined using the above determined duty cycle and notch number information. This information is then loaded into interface 38 and the cycle completed by rereading all input variables.

As an additional feature, when a two or more speed transmission 20 is employed, a gear shifting function must be inserted in the above described routine. A convenient place would be immediately after execution of the diagnostic and alarm routines wherein as a function of motor and vehicle speed, operator input (torque demand) and stored constants, a gear shift requirement question would be posed which if answered negatively would continue the program and if answered affirmatively would cause the execution of the gear shift sequence prior to returning to the main program. The gear shift sequence comprises temporarily suspending torque demand from the operator and placing the motor under the full control of the processor (internal demand) during which a new set of shift speed ratios are established and finally, the actual gear shift execution is made. Subsequently, driver torque demand is re-established as an input.

Referring to FIG. 7, a detailed schematic diagram of DAC 50, F/V converter 70 and voltage control oscillator circuit 72 is illustrated. Note that terminal designations by roman numeral refer to the specific referenced integrated circuit and that it is contemplated that other equivalent circuits can be substituted. Data bus 56 is connected to terminals II through IX of DAC 50 which is of the type marketed by Signetics, Model NE5018. A single line from address bus 54 is connected to one of the inputs of a nand gate 124, the output of which is connected to terminal X of DAC 50. One line of control bus 44 is connected to both inputs of a nand gate 126 the output of which is connected to the remaining input of nand gate 124. Terminal I of DAC 50 is connected to tie point 120. Terminal XXII of DAC 50 is connected to tie point 118. Terminals XX and XV of DAC 50 are commonly connected to tie point 118 through a back biased diode 128. Terminal XVIII of DAC 50 is connected to tie point 118 through a 4.7 kohm resistor 130 and to terminal XX through a 470 picofarad capacitor 132. Terminal XX of DAC 50 is also connected to terminal XXI through a 1000 picofarad capacitor 134. Terminals XVII and XVI of DAC 50 are interconnected by a 0.1 microfarad capacitor 136. Terminal XVII of DAC 50 is connected directly to the −15 VDC regulated power supply 116 and to tie point 118 through a 0.1 microfarad capacitor 138. Terminal XIX of DAC 50 is connected directly to the +15 VDC regulated power supply 116 and interconnected to tie point 118 through a 0.1 microfarad capacitor 140. Terminals XIII and XIV of DAC 50 are commonly connected to the +5 VDC regulated power supply 116 and interconnected to tie point 118 through the fixed resistor portion of a 10 kohm trim potentiometer 142. The wiper of potentiometer 142 is connected to terminal XII of DAC 50 through a 71.5 kohm resistor 144.

Terminal XVIII of DAC 50 is the output carrying slip command signals and is electrically interconnected to terminal I of F/V converter 70 through a series combination of the fixed resistor portion of a 500 kohm potentiometer 146 and a 234 kohm resistor 148. The wiper of potentiometer 146 is electrically connected to the common tie point of potentiometer 146 and a resistor 148. F/V converter 70 is of the type manufactured by Burr-Brown type VFC32KP. Potentiometer 146 serves to calibrate the output of DAC 50.

Terminal I of F/V converter 70 is connected to the wiper of a 10 kohm potentiometer 150 through a 3.8 meg ohm resistor 152. The fixed terminals of potentiometer 150 are connected to the +15 VDC and −15 VDC power supply 116. Potentiometer 150 thereby serves as a zero calibration trimmer which eliminates any offset error which otherwise would be significant because slip is a relatively small percentage of the rotor frequency signals. The FRS signal is fed to the input terminal X of F/V converter 70 through a 470 picofarad coupling capacitor 154. Terminal X of F/V converter 70 is also connected to tie point 118 through a 4.7 kohm resistor 156 and to the 30 -VDC power supply 116 through a parallel combination of a reverse biased diode 158 and a 22 kohm resistor 160. Terminal XII of F/V converter 70 is connected directly to the +15 VDC power supply 116 and to tie point 118 through a 0.01 microfarad capacitor 163. Output terminal XIII of F/V converter 70 is connected to terminal I of VCO 72 through a 33.2 kohm resistor 162 and to terminal I of F/V converter 70 through a 0.0056 microfarad capacitor 164. A series combination of a 30.1 kohm resistor 166 and the fixed terminals of a 20 kohm span trim potentiometer 168 is connected in parallel with capacitor 164. Output terminal V of F/V converter 70 is connected to tie point 118 through a 1800 picofarad capacitor 170.

The summed outputs of F/V converter 70 and the slip command signal are passed into VCO 72 at its terminal I. VCO 72 is of the type manufactured by Burr-Brown type VFC32KP. Terminal I of VCO 72 is also commonly connected to terminals X and XIII of VCO 72 through a 1000 picofarad capacitor 172. Terminal IV of VCO 72 is directly to the −15 VDC power supply 116 and interconnected to tie point 118 through a 0.01 microfarad capacitor 174. Terminals XI and XIV of VCO 72 are directly connected to tie point 118 and terminal V of VCO 72 is interconnected to tie point 118 through a 150 picofarad capacitor 176. Terminal XII of VCO 72 is directly connected to the +15 VDC power supply 116 and to tie point 118 through a 0.01 microfarad capacitor 178. Output terminal VII of VCO 72 is connected to the +5 VDC power supply 116 through a 1 kohm current limiting resistor 180. The signal at the output terminal VII of VCO 72 is FMSRCK which passes onto interface 38.

Referring to FIG. 8, a detailed schematic diagram of speed pickup 66 and associated speed signal conditioning circuit 64 is illustrated. A sixty tooth rotor gear 182 is mounted for rotation with the rotor of motor 18. A magnetic pickup sensor 184 is mounted to the stator of motor 18 adjacent the teeth of gear 182. Sensor 184 is of the type manufactured by Electro, Model 301-AN which operates to sense the passing teeth and thereby derive a signal representative of motor rotor speed. A pair of twisted leads from pickup 184 are interconnected to the + and − input of an op amp 186 through a series combination of two 56 kohm resistors 188 and 190 and a single 56 k resistor 192 respectively. Op amp 186 is also electrically connected to tie point 118 and to the +5 VDC power supply 116. The point of common connection between resistors 188 and 190 is connected to the negative input of op amp 186 through a 100 picofarad capacitor 194. The positive and negative inputs of op amp 186 are also interconnected by a pair of anti-parallel diodes 196 and 198.

The output of op amp 186 is connected to the +5 VDC power supply 116 through a 4.7 kohm biasing resistor 200 and to the positive input terminal of op amp 186 through a 750 kohm feed back resistor 202. The output of op amp 186 goes to one input of each of two exclusive nor gates 204 and 206.

The FCAL signal is transmitted on a line from local oscillator 68 which is connected to one input of a nand gate 208 through a 22 kohm resistor to 210. The output of nand gate 208 is commonly tied to the other two inputs of exclusive nor gates 204 and 206. CALSW signal is carried on a line from command decoder 52 which is connected to both inputs of a nand gate 212 through a 22 kohm resistor 214. The input line from command decoder 52 is also connected to the 30 5 VDC power supply 116 through a 4.7 kohm resistor 216. The output of nand gate 212 is connected to the remaining input of nand gate 208 and interconnected to the positive input of op amp 186 through a diode 218.

The output of exclusive nor gate 206 is connected to one input of another exclusive nor gate 220 through a 22 kohm resistor 222. The other terminal of exclusive nor gate 220 is connected to tie point 120. The two input terminals of an exclusive nor gate 220 are interconnected by a 470 picofarad capacitor 224. The outputs of exclusive nor gates 204 and 220 are connected to the two inputs of an exclusive nor gate 221 whose output carries the FRS signal to F/V converter 70. Nand gate 208 operates to switch in the FACL and CALSW signals. The exclusive nor gates and the associated circuitry act as a frequency doubler.

Referring to FIG. 9, a detailed schematic diagram of interface 38 is illustrated. A line from data bus 56 carrying serial duty cycle date is connected to input terminal II of buffer shift register 226 which is of the type manufactured by Synertek, Model SYP2534. Buffer shift register 226 is ganged with two identical buffer shift registers 228 and 230, terminal III of buffer shift register 226 being connected with terminal VII of buffer shift register 228 and terminal VI of buffer shift register 228 being connected with terminal II of buffer shift register 230. Terminal IV of buffer shift register 226 is directly connected to digital tie point 120 while terminal III of buffer shift register 126 is interconnected to tie point 120 through a 470 picofarad capacitor 232. Terminals VIII of I of buffer shift register 226 are connected to the +5 VDC power supply 116. Terminal VI of buffer shift register 228 is connected to tie point 120 through a 400 picofarad capacitor 234. Terminal V of buffer shift register 228 and terminal V of buffer shift register 230 are commonly connected to the output terminal of a nand gate 236. Terminals I and VIII of buffer shift register 230 are connected to the 30 5 VDC power supply 116.

The line interconnecting microprocessor 146 and interface 38 which carries the FCSRCK signal actually comprises two conductors, one of which is connected to both inputs of a nand gate 238 and one of the inputs of another nand gate 240. The other line carrying the FCSRCK signal connects to one of the inputs of a nor gate 242. The output of nand gate 238 is connected to the other input of nor gate 242.

The line carrying the BSRFL signal from microprocessor 46 to interface 38 also comprises two conductors both of which terminate in the inputs of a nor gate 244. The output of nor gate 244 connected to the remaining input of nand gate 240. The output of nor gate 242 is connected to an input of a nand gate 246 the output of which is connected to one input of nand gate 236. The output of nand gate 240 is connected to one of the inputs of a nand gate 248 whose output is connected to one of the inputs of another nand gate 250. The output of nand gate 250 is connected to the remaining input of nand gate 248. This arrangement of gates comprises a latch, the operation of which is well known in the art. The output of nand gate 248 is also connected to one of the inputs of a nand gate 252.

The line transmitting the FMSRCK signal from VCO circuit 72 to interface 38 terminates in terminal X of a type 4040 twelve stage binary divider 254. Terminal XIV of divider 254 is connected to one input of a nand gate 256. Terminal XV of binary divider 254 is connected to the other input terminal of nand gate 256. The output of nand gate 256 is commonly connected to both inputs of another nand gate 258. Terminal VIII of divider 254 is connected to tie point 120 and terminal XVI of divider 254 is connected to the 30 5 VDC power supply 116. The output of nand gate 258 is connected to the remaining input of nand gate 252 and to tie point 120 through a series combination of a 6.8 kohm resistor 260 and a 100 pricofarad capacitor 262. The point of common connection between resistor 260 and capacitor 262 is connected to terminal XI of divider 254.

The output of nand gate 252 is connected to an input of another nand gate 264 the output of which is connected to one of the inputs of another nand gate 266. The output of nand gate 266 is connected to the remaining input of nand gate 264, forming another latch. The output of nand gate 266 is connected to the remaining input of nand gate 250. The output of nand gate 258 is also connected to one of the inputs of another nand gate 268. The output of nand gate 268 is connected to the remaining input of nand gate 266. The remaining input of nand gate 268 is connected to tie point 120 through a 0.01 microfarad capacitor 270 and to the output of nand gate 264 through a 22 kohm resistor 272.

The output of nand gate 268 is connected to one input of another nand gate 274 the output of which is connected to an input of another nand gate 276. The output of nand gate 276 is connected to the remaining input terminal of nand gate 274 to form an interrupt latch. The output of nand gate 276 is electrically connected to microprocessor 46 carrying the interrupt signal. The output of nor gate 242 is also connected both inputs of another nor gate 278 whose output is connected to the remaining input of nand gate 276. The output of nand gate 264 is connected to both inputs of a nand gate 280, one input of a nand gate 282 one input of another nand gate 284 and both inputs of still another nand gate 286. The output of nand gate 280 is connected to the remaining input of nand gate 246. The output of nand gate 282 is connected to the remaining input of nand gate 236. The remaining input of nand gate 282 is connected to terminal X of divider 254. The output of nand gate 284 is connected to an input of another nand gate 288. The output of nand gate 286 is connected to an input of another nand gate 290 the output of which is connected to the remaining input of nand gate 288.

The output terminal of nand gate 288 is connected to tie point 120 through a 470 picofarad capacitor 292 to an input terminal II of master shift register 294 which is ganged with two identical registers 296 and 298 much the same as were buffer shift registers 226, 228 and 230. Terminal III of master shift register 294 is connected to terminal VII of master shift register 296. Terminal VI of master shift register 296 is connected to terminal II of master shift register 298. Terminal III of master shift register 298 is connected to the remaining input of nand gate 290. Terminals I and VIII of master shift register 296 and terminals I and VII of master shift register 298 are connected to the +5 VDC power supply 116. Terminal IV of master shift register 294 is directly connected to tie point 120. Terminal III of master shift register 294 is interconnected to tie point 120 through a 470 picofarad capacitor 300. Terminal V of master shift register 294 and terminal V of master shift register 298 are connected to terminal X of divider 254. Terminal VI of master shift register 296 is connected to tie point 120 through a 470 picofarad capacitor 302. A 0.01 microfarad capacitor 304 is interconnected between the +5 VDC power supply 116 and tie point 120 locally at each type 74L500 IC and each type SYP2534 IC device.

Terminal II of master shift register 294 is connected directly to one input of a nand gate 306 and interconnected to an input of another nand gate 308 through an inverter 310. The output of nand gate 306, paired with a reference line connected to the +5 VDC power supply 116 through a 200 ohm resistor 312 carries the switch command signal to leg one of the three Φ power bridge 34. The output of nand gate 308, paired with another reference line connected to the +5 VDC power supply 116 through a 200 ohm resistor 314 comprises the complement signal to leg one of power bridge 34.

Terminal VII of master shift register 296 is connected to one input of nand gate 316 and one input of another nand gate 318. Terminal II of master shift register 298 is connected to one input of a nand gate 320 and one input of another nand gate 322. The line from command decoder 52 carrying the forward/reverse Φ-shift signal is connected directly to the remaining input terminals of nand gate 316 and 320 and interconnected to the remaining input terminals of nand gates 318 and 322 through an inverter 324. The output of nand gate 316 is connected to one input of a nand gate 326 and the output of nand gate 322 is connected to the remaining input of nand gate 326. The output of nand gate 318 is connected to one input of a nand gate 328 and the output of nand gate 320 is connected to the remaining input of nand gate 326 is connected directly to one input of a nand gate 330 and indirectly to one input of another nand gate 332 through an inverter 334. Likewise, the output of nand gate 328 is directly connected to one input of a nand gate 336 and indirectly to an input of another nand gate 338 through inverter 340. The output of nand gate 330, paired with a reference line connected to the +5 VDC power supply 116 through a 200 ohm resistor 342 is connected to leg two of power bridge 34. The output of nand gate 332, coupled with a reference line connected to the +5 VDC power supply 116 through a 200 ohm resistor 344 are also connected to the second leg of power bridge 34. The output of nand gate 336, coupled with a reference line connected to the +5 VDC power supply 116 through a 200 ohm resistor 346 is connected to leg three of power bridge 34 and the output of nand gate 338 coupled with a reference line connected to the +5 VDC power supply 116 through a 200 ohm resistor 348 is also connected to leg three of power bridge 34.

The output nand gate 240 is connected to both inputs of a nand gate 350 the output of which is connected to both inputs of nand gates 352 and 354 through a forward biased diode 356. The inputs of nand gates 352 and 354 are also connected to tie point 120 through a parallel combination of a 10 meg ohm resistor 358 and a 0.0068 microfarad capacitor 360. The output of nand gates 352 and 354 are commonly interconnected to both inputs of a nand gate 362 through a series combination of a 2.2 kohm resistor 364 and a reverse biased diode 366. The inputs to nand gate 362 are also interconnected to the +5 VDC power supply 116 through a 1.5 meg ohm resistor 368 and to tie point 120 through a 0.33 microfarad capacitor 370. The output of nand gate 362 is interconnected with both inputs of a nor gate 372 through a 2.2 kohm resistor 374. The input terminals of nor gate 372 are connected to the +5 VDC power supply 116 through a parallel combination of a 330 kohm resistor 376 and a reverse biased diode 378. The inputs of nor gate 372 are connected to tie point 120 through a parallel combination of a 1 microfarad capacitor 380 and a single pole single throw switch 382. The output of nor gate 372 is connected to both inputs of a nand gate 384 the output of which is connected to one of the inputs of a nand gate 386. The output of nand gate 386 is commonly interconnected to the remaining inputs of nand gates 306, 308, 330, 332, 336 and 338 through an inverter 388. The line carrying the master inhibit-shutdown signals from command decoder 52 is connected to both inputs of a nand gate 390 and interconnected to the +5 VDC power supply 116 through a 4.7 kohm resistor 392. The output of nand gate 390 is connected to the remaining input of nand gate 386.

In operation, interface 38 serially receives duty cycle data from the control circuit 36 (data bus 56) and temporarily stores that data in buffer shift registers 226, 228 and 230. Circuitry associated with gates 266, 264, 268, 248, 250, 280, 264, 236, 288, 290, 284, 286, 242, 238, 244 and 240 operate as pulse steering gates which transfer the serial duty cycle data from the buffer shift registers 226, 228 and 230 to the master shift registers 294, 296 and 298. Divider 254, gates 256, 258 and 252 along with associated discrete circuitry, operate as a sync detector whereby switch command signals are gated from gates 306, 308, 330, 336 and 338 at a rate synchronized with motor 18. Gates 384, 386 and 390 function to inhibit the driver gates upon receiving a master inhibit-shutdown signal. Gates 316, 322, 318, 320, 326 and 328 provide the forward/reverse feed logic. Diode 378, resistor 376, capacitor 380 and switch 382 provide a reset circuit which is automatic upon power-up of the control circuit and can be manually initiated via switch 382. Finally, a failsafe shutdown system is provided via gates 350, 352, 354, 362 and their associated circuitry which inhibit the drive gates if a timely update command is not received.

Referring to FIG. 10, a schematic diagram of the top half of leg one of three Φ power bridge 34 is illustrated. The top half of leg one is defined as being that receiving the $\Phi_1$ signal from interface 38 and the bottom half is defined as that portion receiving the inverse signal $\overline{\Phi}_1$ from interface 38. The complementary (bottom) circuit portion of leg one of power bridge 34 is substantially identical to that disclosed in FIG. 10 and is deleted for sake of brevity. In addition, the schematic and operation of the circuits contained in legs 2 and 3 of power bridge 34 are identical to that of leg one.

The output of interface 38 carrying the $\Phi_1$ information is connected to the input terminals of an optical coupler 394 within leg one of power bridge 34. Optical coupler 394 is of the type manufactured by Hewlett-Packard, Model HP5082-4351 and corresponds with isolation circuit 71 in FIG. 5. The photo diode output of optical coupler 394 is connected to a $+V_L$ (logic) power supply. The emitter terminal of optical coupler 394 is connected to a logic common tie point 396. The collector output terminal of optical coupler 394 is interconnected with power supply $+V_L$ through a 3.3 kohm resistor 398 and interconnected with both inputs of a nand gate 400 through a 22 kohm resistor 402. The output of nand gate 400 is connected to both inputs of nand gate 400 through a 100 kohm resistor 406. Gates 400 and 404 and resistors 402 and 406 comprise a Schmidt trigger, the operation of which is well known in the art. The output of nand gate 404 interconnected to one of the inputs of another nand gate 408 through a 100 picofarad coupling capacitor 410. The output of nand gate 408 is connected to one input of another nand gate 412 the output of which is connected to the remaining input of nand gate 408. The output of nand gate 408 is also connected to one of the four inputs of a type 4012 nand gate 414. The input of nand gate 408 connected to capacitor 410 is also connected to the $+V_L$ power supply through a 56 kohm resistor 416. The remaining input of nand gate 412 is interconnected with $+V_L$ power supply through a series combination of a 22 kohm resistor 418 and an 820 ohm resistor 420. Nand gates 408 and 412 comprise an over current latch. The output of nand gate 400 is connected to another input of nand gate 414 and to both inputs of a nand gate 422. The output of nand gate 422 is connected to $+V_L$ power supply through a series connected 220 ohm resistor 424 and a light emitting diode (LED) 426. Nand gate 422, resistor 424 and LED 426 comprise a diagnostic circuit which will energize LED 426 should the input voltage level of nand gate 422 rise above $V_L/2$.

A second optical coupler 428 has its LED input connected to the complementary gate circuit 78 (see FIG. 5). The photo diode output terminal of optical coupler 428 is connected to the $+V_L$ power supply and the emitter output terminal is connected to tie point 396. The collector terminal of optical coupler 428 is interconnected with $+V_L$ power supply through a 3.3 kohm resistor 430 and interconnected to both inputs of a nand gate 432 through a 22 kohm resistor 434. The output of nand gate 432 is connected to both inputs of another nand gate 436 whose output is interconnected to the inputs of nand gate 432 through a 100 kohm resistor 438. Nand gates 432 and 436 and resistors 434 and 438 comprise a Schmidt trigger. The output of nand gate 432 is connected to one of the remaining inputs of nand gate 414 and to both inputs of a nand gate 440. The output of nand gate 440 is interconnected to $+V_L$ power supply through a series connected 220 ohm resistor 442 and LED 444. Nand gate 440, resistor 442 and LED 444 constitute a diagnostic test circuit. Optical coupler 428 is the equivalent of isolation circuit 80 in FIG. 5.

Power switch 92 as illustrated in FIG. 5 comprises a series connected snubber inductor (not illustrated) and a power transistor 446. Also included are voltage and current sensing circuits. Finally, an output to energy recovery circuit 100 is also embodied within power switch 92. The details of the snubber and energy recovery circuit are the subject of a copending application referenced hereinabove. During the portion of the cycle of operation in which transistor 446 is conductive, the heavy current flow is through positive bus 96, the snubber inductor, transistor 446 and $\Phi_{1(PWR)}$ output line. During this period, the complementary power transistor within leg one is in the nonconductive state. In the portion of the cycle which transistor 446 is not conductive, the complementary power transistor in leg on may be conductive. In that case, the heavy current will be through the minus bus 98, the complementary snubber inductor and the complementary transistor.

Sensing of the collector current within power transistor 446 is accomplished by a magnetic circuit comprising two ferrite core pieces 448 and 450 and a hall effect switch 452 which is of the type manufactured by Sprague, Model UGS3019T. The collector lead of power transistor 446 is passed through a gap between ferrite core pieces 448 and 450 which is calibrated and adjusted to cause switch 452 to open or close at a predetermined collector current level. The positive terminal of switch 452 is connected to the $+V_L$ power supply and the negative terminal is connected to tie point 396. The output terminal of switch 452 is connected to the point of common connection between resistors 420 and 418. The leads from switch 452 are shielded and the shield is connected to tie point 396.

The voltage level (and negative current sense) of the collector of power transistor 446 is measured through a lead which is interconnected to the noninverting terminal of a negative current sense op amp 454 through a series combination of a 6.8 kohm resistor 456 and a 100 ohm resistor 458. The point of common connection between resistors 456 and 458 is connected to tie point 396 through a diode 460. The shielded lead from the collector of power transistor 446 is also interconnected with the inverting input of another voltage sensing op amp 462 through a 232 kohm resistor 464. The shield of the voltage lead is also connected to tie point 396. The inverting input of op amp 454 is connected to tie point 396 through a 10 kohm resistor 466. The inverting input of op amp 454 is also connected to tie point 396 through a series connected 18 kohm resistor 468 and diode 470. The point of common connection between resistor 468 and diode 470 is connected to a $-V_B$ power supply through a 1 kohm resistor 472. The output of op amp 454 is connected to its noninverting input through a 150 kohm resistor 474. The output of op amp 454 is interconnected with a node designated A through a 3 kohm resistor 476. Node A is directly connected to the remaining input of nand gate 414 and to two of the four inputs of a nand gate 478. Finally, node A is connected to the $+V_L$ power supply through a 4.7 kohm resistor 480.

The inverting input of op amp 462 is connected to tie point 396 through a 16.5 kohm resistor 482. The noninverting input of op amp 462 is connected to tie point 396 through a 16.5 kohm resistor 484 and to the $+V_L$ power supply through a 16.5 kohm resistor 486. The output of op amp 462 is connected to the $+V_L$ power supply through a 4.7 kohm resistor 488 and commonly to the two remaining inputs of nand gate 478 through a parallel combination of a 15 kohm resistor 490 and a forward biased diode 492. The two inputs to nand gate 478 associated with op amp 462 are also connected to tie point 396 through a 1000 picofarad capacitor 494. The output of nand gate 478 is connected to the base of a type 2N3414 transistor 496. The emitter of transistor 496 is interconnected to tie point 396 through a 390 ohm resistor 498. The collector of transistor 496 along with a lead from the $+V_L$ power supply are connected to complementary isolation circuit 80 (refer to FIG. 5).

The output terminal of nand gate 414 is interconnected with terminals I, II, VI and VII of a buffer 500 through a 20 kohm resistor 502. Buffer 500 is of the type manufactured by National Semi-Conductor, Model 8632N. Terminal IV of buffer 500 is connected directly to the $+V_B$ power supply and interconnected with terminal VIII of buffer 500 through a series combination of a 10 kohm resistor 504 and a 4.7 microfarad capacitor 506. Terminal I of buffer 500 is interconnected with the point of common connection between resistor 504 and capacitor 506 with a reverse biased diode 508. Terminal I of buffer 500 is interconnected to the $-V_B$ power supply through a 30 kohm resistor 510. Terminal VIII of buffer 500 is connected to the $+V_B$ power supply. Terminals III and V are commonly interconnected to a node B through a 10 ohm resistor 512. Node B is connected to the $+V_B$ power supply through a 30 ohm resistor 514 and directly to the base of a type D44H2 transistor 516 of the type manufactured by General Electric Corporation. The collector of transistor 516 is interconnected to the $+V_B$ power supply through a 0.40 ohm resistor 518. The emitter of transistor 516 is connected, through one lead of a twisted pair to the base terminal of power transistor 446 which is of the type manufactured by Toshiba, Model 2SD648. The emitter of transistor 516 is also connected to the emitter of a transistor 520 which is of the type manufactured by General Electric, type D45H2. The collector of transistor 520 is connected to the $-V_B$ power supply. The base of transistor 520 is connected to its emitter through a diode 522 and to node B through a parallel combination of a 680 ohm resistor 524 and a series connected 56 ohm resistor 526 and a 0.47 microfarad capacitor 528. The other lead in the twisted pair interconnects the emitter of transistor 446 with a power common tie point 530. Finally, a type GEA397 fly back or inverse parallel diode 532 interconnects the collector and emitter of transistor 446.

The dual switching power supply 84 supplies only the circuit illustrated in FIG. 10. Five other identical power supplies are provided to individually power the complimentary circuit in leg one as well as the circuits in legs two and three. Power supply 84 has output terminals $+V_B$ and $-V_B$. The level of those voltages will depend upon the specific components used in an implementation of the present invention. Power supply 84 also has common connections to tie points 396 and 530. The $+V_L$ power source is derived from a 13 volt unregulated tap from power supply 84 which is connected to terminal I of a type SG7808C regulator 534. Output terminal II of regulatr 534 is connected to tie point 396 through a 47 microfared capacitor 536 and represents the output terminal $+V_L$. Terminal II of regulator 534 is also connected to tie point 396 through a series combination of a 470 ohm resistor 538 and a LED 540. LED 540 serves as a diagnostic aid. Output terminal III of regulator 534 is connected to tie point 396. The plus and minus buses 96 and 98 provide electrical energy to power supply 84. Note that only one half of power supply 84 is illustrated. The other half provides a $+V_B$, $-V_B$ and referenced tie points 396 and 530 to the complimentary base drive circuit within leg one while maintaining a large breakdown voltage isolation between the two supplies.

In operation, the circuit of FIG. 10 receives the switch command signals pertaining to phase one of motor 18 from interface 38. This is isolated from the gate drive logic 76 by optical coupler 394. The output from optical coupler 394 is passed through a Schmidt trigger to clean up the waveform and provide sharp transistions. The output of the Schmidt triggers is fed directly to a four input gate and coupled as a reset into a overcurrent latch which is set via the current sensing lines operating on pull up resistor 420. The output of the current latch is also fed to gate 414. An enabling signal from the complimentary gate drive circuit is first isolated by optical coupler 428, passed through a Schmidt trigger and then fed into an input of gate 414. Finally, op amp 454 operates as a comparator to sense power transistor negative voltage indicating current in diode 532 and transmit an inhibit signal to gate 414. The output of gate 414 controls the operation of power transistors 446 through buffer 500 and its associated circuitry. Thus, in order for transistor 446 to become conductive, the following four outputs must be received by gate 414: (1) command from microprocessor 46, (2) enable signal from complimentary gate drive 78, (3) overcurrent latch reset and, (4) no negative current sensed through fly back diode 532.

Capacitor 528 and resistor 526 operate to provide a low resistance path during the turn off of power transistor 446. Resistors 456 and 458 along with diode 460 provide a level shift and protective clamp for op amp 454. Diode 508, resistor 504, and capacitor 506 constitute a power-on reset circuit. The output of op amps 454 and 462 are passed through gate 478 to the complimentary gate drive logic 78 through isolation circuit 80. This arrangement assures that both power transistors in a single leg will never be in the conductive state at the same time.

Figure 11:
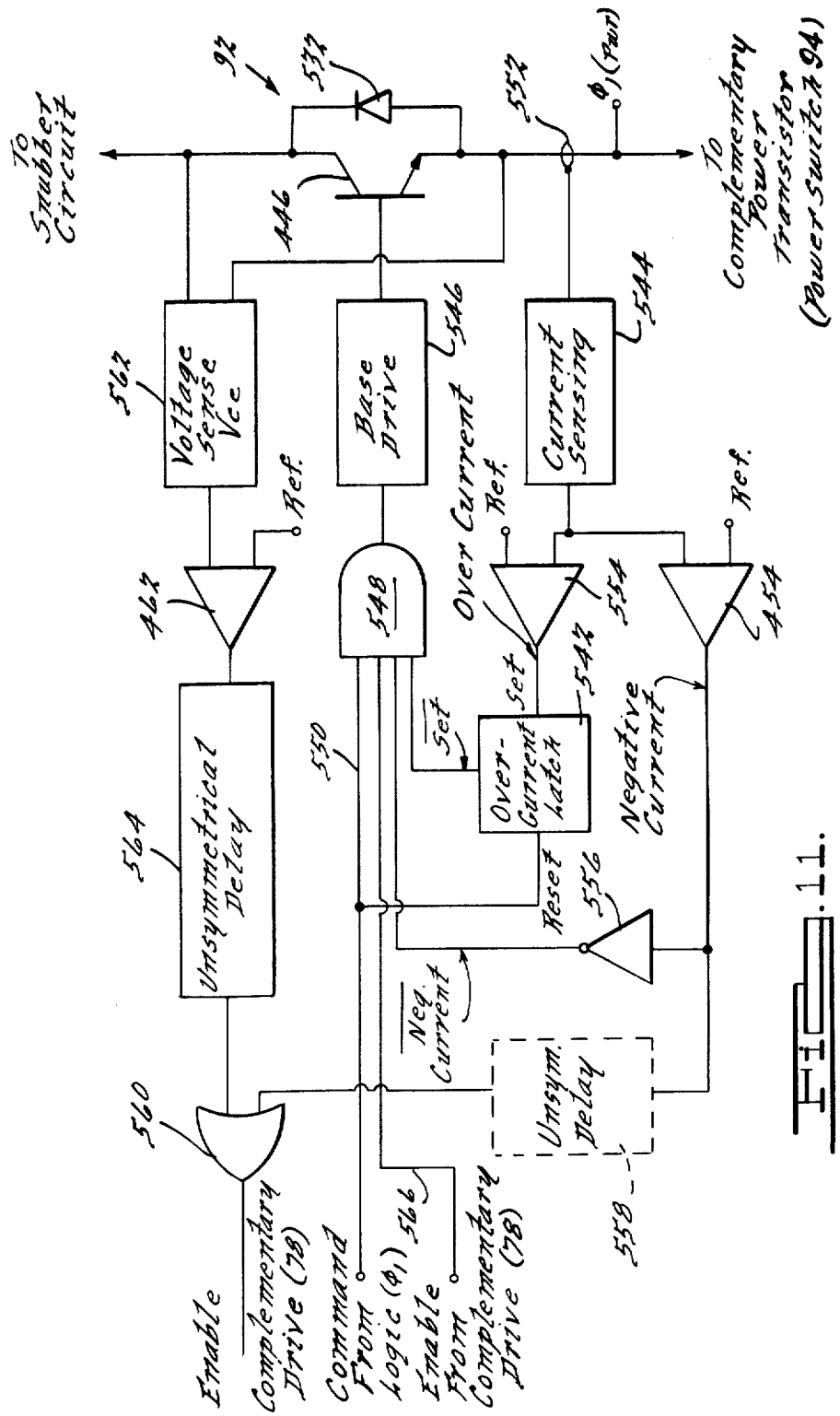
FIG. 11, is a simplified block diagram of the portions of the schematic diagram of FIG. 10, which more clearly delineates the present invention.

The reiterate and more clearly define the present invention, referring to FIG. 11, a simplified block diagram of the present invention is illustrated. FIG. 11 functionally corresponds with the schematic of FIG. 10 but is illustrated in simplified terms and symbols as much as possible whereas FIG. 10 illustrates the hardware embodiment of the present invention.

The present invention in its preferred embodiment is a circuit which prevents transistor 446 from switching to a conductive state without the fulfillment of four conditions. Those conditions are: (1) a command from logic circuit 36 (see FIG. 2); (2) an enabling signal from complimentary gate drive logic circuit 78 (see FIG. 5); (3) absence of an overcurrent latch signal from an overcurrent latch 542, and; (4) absence of a negative current signal from a current sensing circuit 544.

Referring to FIG. 11, the upper portion of leg one of three-phase power bridge 34 is illustrated corresponding with FIG. 10). Power transistor 446 is connected in series with its compliment between the positive and negative power buses 96 and 98 (see FIG. 5). Snubber inductors (not illustrated) are also connected in series with power transistor 446, but are deleted for the sake of brevity. The base of transistor 446 is connected to the output of a base drive circuit 546 which, in turn, is controlled by the output of a four input and gate 548. And gate 548 corresponds in FIG. 10 with nand gate 414 and is illustrated without the inverting function to simplify the present discussion of the invention.

A line 550 carrying the command from logic $\Phi_1$ is connected to one of the inputs of and gate 548. Line 550 is also connected to a reset input terminal of overcurrent latch 542. The output of latch 542 is connected to another input of and gate 548 and carries the inverse of the set signal received by latch 542, designated $\overline{set}$. A noncontacting current sensing loop 552 is connected to the input of a current sensing circuit 544 which monitors the emitter (or collector) current of transistor 446. Current sensing loop 552 is shown in the emitter circuit of transistor 446 rather than in its collector circuit (as was the case in FIG. 10) only to provide a simplified FIG. 11. As any one skilled in the art would appreciate, the net effect is the same and such inconsistancies as between FIGS. 10 and 11 are merely only for the sake of simplifying the readers understanding of the present invention. In effect then, current sensing circuit 544 and comparator 554 is FIG. 11 represents Hall effect switch 452 and ferrite core pieces 448 and 450 in FIG. 10. The output of comparator 554 is an overcurrent signal which is transmitted to overcurrent latch 542 (nand gates 408 and 412 in FIG. 10).

The overcurrent signal operates to set overcurrent latch 542 which transmits the $\overline{set}$ signal to one of the inputs of and gate 548. The net effect of the overcurrent input into and gate 548 is to limit forward current through transistor 446 and to disable transistor 446 should the forward current therethrough exceed an established limit. The output of current sensing circuit 544 also passes to one of the inputs of the negative current sense comparator 454. The output of comparator 454 is connected to another input of and gate 548 through an inverter 556. The output of comparator 454 is a negative current signal which is inverted (and designated $\overline{\text{negative current signal}}$) and passed as one of the inputs into and gate 548. The net effect of the negative current input into and gate 548 is to keep transistor 446 off or in the nonconducting state when diode 532 is conducting. This is desirable because it prevents negative transistor currents and allows faster turn on of the compliment is pwm applications. Note that negative current sensing is effected in the circuit of FIG. 10 by sensing negative $V_{ce}$ rather than a current loop as in FIG. 11.

The output of comparator 454 is also connected to one of the inputs of an or gate 560 through an optional unsymmetrical delay circuit 558. Although unsymmetrical delay circuit 558 was not illustrated in FIG. 10, if desired, it would be inserted electrically intermediate node A and the two common inputs of nand gate 478 which are illustrated (in FIG. 10) as being directly connected to node A.

A voltage sense circuit 562 is connected across transistor 446 to sense the collector to emitter voltage thereof. In FIG. 10 this is accomplished by resistors 464 and 482. The output of voltage sense circuit 562 goes to one of the inputs of voltage sensing comparator 462. The output of comparator 462 passes through another unsymmetrical delay circuit 564, the output of which is connected to the remaining input of or gate 560. Unsymmetrical delay circuit 564 corresponds with resistor 490, diode 492 and capacitor 494 in FIG. 10. The output of or gate 560 carries an enabling signal for the complimentry drive 78.

Unsymmetrical delay circuit 558 may be desirable because of its propensity to allow transistor 446 to recover (shutdown) from saturation when the forward current suddently becomes negative before enabling the turn on of the complimentary transistor. Unsymmetrical delay circuit 564 is included when a snubber capacitor (no shown-refer above referenced copending application) is employed. This will prevent the complimentary transistor from turning on until the snubber capacitor for that leg is fully discharged. In effect the, the enabling signal from the complimentary drive 78 represents an or function of the negative current sense and the voltage sense of the complimentary portion of the leg. This arrangement is particularly advantageous in pwm control schemes requiring relatively fast response times where it is necessary to establish that the complimentary diode is conducting prior to turning on power transistor 446. The negative current, in effect, overrides the voltage sense to allow the turning on of transistor 446 when the complimentary diode is conducting. Accordingly, the enable signal from complimentary drive 78 will be transmitted to and gate 548 via line 566 when the complimentary diode is conducting or when a voltage drop is measured across the complimentary transistor.

The unsymmetrical feature in the delay circuit 564 operates as follows: when no voltage is sensed across the complimentary transistor, power transistor 446 is shut off immediately and if a voltage is sensed across the complimentary transistor a settling time will be allowed before power transistor 446 is turned on. This results in a faster response time than the conventional method of turning one transistor of the complimentary pair on, subsequently turning that transistor off, waiting a predetermined period of time, then finally turning on the complimentary transistor.

As an aid to the reader in correlating FIGS. 10 and 11, the voltage sense circuit 562 is comprised of buffer 500, resistors 514, 516, 518 and 512, transistors 516 and 520, diode 508, capacitor 506, resistors 504 and 510, resistor 502, diode 522, resistors 524 and 526, and capacitor 528 in FIG. 10.

It is to be understood that the invention has been described with reference to a specific embodiment which provides the features and advantages previously described, and that such specific embodiment is susceptible of modification, as will be apparent to those skilled in the art. It is also to be understood that although described in the environment of an electric vehicle, in its broadest sense, the present invention can be adapted for other applications. Accordingly, the foregoing description is not to be construed in a limiting sense.

What is claimed is:

1. A base drive and overlap protection circuit comprising:
power switching means;
means operative to monitor current flow through said power switching means and to generate a negative current signal as a function thereof; and
gating means operative to receive said negative current signal, switch command signals from a control circuit and an enable signal from an enabling circuit, and to generate a switching signal in response thereto, said power switching means being operative to switch from a first state to a second state in response to said switching signal.

2. The circuit of claim 1, further comprising means operative to generate a complimentary base drive enabling signal as a function of said negative current signal and the voltage differential across said power switching means.

3. The circuit of claim 2, further comprising means operative to delay said complimentary base drive enabling signal for a predetermined period of time.

4. The circuit of claim 1, wherein said power switching means is conductive in said first state and nonconductive in said second state.

5. The circuit of claim 1, wherein said power switching means is conductive in one direction in said first state and conductive in both directions in said second state.

6. The circuit of claim 5, wherein said power switching menas comprises a power transistor connected in anti-parallel with a diode.

7. The circuit of claim 6, wherein said negative current signal is generated when forward current flows through said diode.

8. The circuit of claim 1, further comprising overcurrent latch means operative to interrupt generation of said switching signal when the current flow through said power switching means exceeds a predetermined value.

9. The circuit of claim 8, wherein said overcurrent latch means further operates to reset upon receipt of a subsequent switch command signal.

10. A base drive and overlap protection circuit for an inverter of the type having a plurality of complimentary power switching means arranged to reciprocally energize a common load in response to switch command signals generated by a control circuit, said base drive and overlap protection circuit comprising:
means operative to monitor current flow through said complimentary power switching means and to generate negative current signals as a function thereof;
means operative to monitor the voltage drop across said complimentary power switching means and to generate voltage sense signals as a function thereof;
means operative to generate distinct enabling signals for each said switching means as a function of said negative current signals and said voltage sense signals; and
gating means operative to selectively actuate one of said power switching means in response to receipt of enable signals from another of said switching means, said switch command signals and negative current signals, whereby at least one of said complimentary switching means is in a nonconductive state at all times.

11. The circuit of claim 10, further comprising means operative to delay generation of said enabling signals for a predetermined period of time.

12. The circuit of claim 10, wherein said power switching means is operative to switch from a first state to a second state in response to a switching signal from said gating means.

13. The circuit of claim 12, wherein said power switching means is conductive in said first state and nonconductive in said second state.

14. The circuit of claim 12, wherein said power switching means is conductive in one direction in said first state and conductive in both directions in said second state.

15. The circuit of claim 14, wherein said power switching means comprises complimentary power transistors, each connected in anti-parallel with a diode.

16. The circuit of claim 15, wherein said negative current signal is generated when forward current flows through one of said diodes.

17. The circuit of claim 10, further comprising overcurrent latch means operative to interrupt activation of said power switching means when the current flow through said power switching means exceeds a predetermined value.

18. A base drive and overlap protection circuit for an inverter of the type having first and second complimentary power switching means arranged to reciprocally energize a common load in response to switch command signals generated by a control circuit, said base drive and overlap protection circuit comprising:
means operative to monitor current flow through said first and second power switching means and to generate first and second negative current signals respectively as a function thereof;
means operative to monitor the voltage drops across said first and second power switching means and to generate first and second voltage sense signals respectfully as a function thereof;
means operative to generate a first enabling signal as a function of said first negative current signal and said first voltage sense signal;
means operative to generate a second enabling signal as a function of said second negative current signal and said second voltage sense signal;
first gating means operative to selectively actuate said first power switching means in response to receipt of said switch command signals, said first negative current signal and said second enabling signal; and
second gating means operative to selectively actuate said second power switching means in response to receipt of said switch command signals, said second negative current signal and said first enabling signal.

19. The circuit of claim 18, further comprising first overcurrent latch means operative to generate a first latch set signal when the current flowing through said first power switching means is less than a predetermined value, and further comprising second overcurrent latch means operative to generate a second latch set signal when the current through said second power switching means is less than another predetermined value.

20. The circuit of claim 19, wherein said first and second overcurrent latch means operate to reset open receipt of a subsequent switch command signal.

21. The circuit of claim 18, further comprising means operative to delay generation of said first and second enabling signals for a predetermined period of time.

22. An inverter for controlling a multi-phase A. C. machine comprising:
a control circuit operative to receive parametric inputs and generate switch command signals as a function thereof;
a complimentary pair of power transistors associated with each phase of said machine, each said pair operative to reciprocally energize said associated phase in response to said switch command signals;
current sensors operative to monitor the current flowing through each of the transistors and to generate corresponding negative current signals as a function thereof;
voltage level sensors operative to monitor the voltage drop across each of the transistors and to generate voltage sense signals as a function thereof;
means associated with each transistor operative to generate an enabling signal as a function of the corresponding negative current signal and voltage sense signal; and
gating means associated with each transistor operative to switch said associated transistor from a nonconductive state to a conducting state in response to receipt of:
said switch command signals;
the negative current singal from said associated transistor; and
the enabling signal from the compliment of said associated transistor.

23. A drivetrain adapted for use with an electric vehicle having at least one tractive wheel, said drivetrain comprising:
a D. C. power source;
a three-phase induction motor;
an inverter for providing a power input from said power source and a power output to each phase of said motor at a preselectable frequency and a preselectable voltage, said inverter comprising:
a control circuit operative to receive parametric inputs and generate switch command signals as a function thereof;
a complimentary pair of power transistors associated with each phase of said motor, each said pair operative to reciprocally energize said associated phase in response to said switch command signals;
current sensors operative to monitor the current flowing through each of the transistors and to generate corresponding negative current signals as a function thereof;
voltage level sensors operative to monitor the voltage drop across each of the transistors and to generate voltage sense signals as a function thereof;
means associated with each transistor operative to generate an enabling signal as a function of the corresponding negative current signal and voltage sense signal; and
gating means associated with each transistor operative to switch said associated transistor from a nonconducting state to a conducting state in response to receipt of:
said switch command signals;
the negative current signal from said associated transistor; and
the enabling signal from the compliment of said associated transistor.

24. A base drive and overlap protection circuit for an inverter of the type having complimentary power switching means arranged to reciprocally energize a common load in response to switch command signals generated by a control circuit, said base drive and overlap protection circuit comprising:
means operative to monitor current flow through said complimentary power switching means and to generate negative current signals as a function thereof;
means operative to monitor the voltage drop across said complimentary power switching means and to generate voltage sense signals as a function thereof;
means operative to generate enabling signals as a function of said negative current signals and said voltage sense signals;
gating means operative to selectively actuate said power switching means in response to receipt of said switch command signals, negative current signals and enable signals, whereby at least one of said complimentary switching means is in a nonconductive state at all times; and overcurrent latch means operative to interrupt activation of said power switching means when the current flow through said power switching means exceeds a predetermined value, and to reset upon receipt of a subsequent switch command signal.

25. The circuit of claim 24, further comprising means operative to delay generation of said enabling signals for a predetermined period of time.

26. The circuit of claim 24, wherein said power switching means is operative to switch from a first state to a second state in response to a switching signal from said gating means.

27. The circuit of claim 26, wherein said power switching means is conductive in said first state and nonconductive in said second state.

28. The circuit of claim 26, wherein said power switching means is conductive in one direction in said first state and conductive in both directions in said second state.

29. The circuit of claim 28, wherein said power switching means comprises complimentary power transistors, each connected in anti-parallel with a diode.

30. The circuit of claim 29, wherein said negative current signal is generated when forward current flows through one of said diodes.

* * * * *